United States Patent [19]

Kondo et al.

[11] 4,029,969

[45] June 14, 1977

[54] METHOD AND DEVICE FOR SUPPRESSING NOISE RADIO WAVES IN MOTOR VEHICLE HAVING IGNITION TYPE ENGINE

[75] Inventors: Hiroshi Kondo; Isamu Murata; Teruo Yamanaka, all of Toyoda, Japan

[73] Assignee: Toyota Jidosha Kogyo Kabushiki Kaisha, Toyoda, Japan

[22] Filed: June 17, 1975

[21] Appl. No.: 587,553

[30] Foreign Application Priority Data

Sept. 14, 1974 Japan .......................... 49-106187

[52] U.S. Cl. .......................... 307/10 R; 180/69 C; 307/91; 174/35 GC
[51] Int. Cl.² .......................................... H02G 3/00

[58] Field of Search ............... 307/9, 10 R, 91, 89, 307/90; 174/35 R, 35 MS, 35 GC; 123/148 P, 169 PH; 296/1 R; 180/69 C; 324/95; 343/703; 325/363, 67

[56] References Cited

UNITED STATES PATENTS

| 2,580,321 | 12/1951 | Rees | 174/35 GC X |
|---|---|---|---|
| 3,306,973 | 2/1967 | Lowerre | 174/35 GC X |

Primary Examiner—Robert K. Schaffer
Assistant Examiner—Morris Ginsburg
Attorney, Agent, or Firm—Stevens, Davis, Miller & Mosher

[57] ABSTRACT

A method of and a device for suppressing the leakage of radio waves radiated from a vehicle by using a bonding means which connects the opposing body portions in the positions of interstices which show the minimum leakage of radio waves therethrough when said opposing portions are not connected.

12 Claims, 18 Drawing Figures

METHOD AND DEVICE FOR SUPPRESSING NOISE RADIO WAVES IN MOTOR VEHICLE HAVING IGNITION TYPE ENGINE

This invention relates to a method and a device for suppressing the noise radio waves in a motor vehicle having a spark ignition type engine, and more particularly to a method and a device for suppressing the leakage of radio waves radiated from an engine or an engine room which houses an ignition system therein.

Hitherto, electromagnetic waves of a radio frequency band are generated from the respective components of an ignition system of an engine, such as a distributor, high tension cable, ignition plug and the like. In addition, the electromagnetic waves are radiated outwards through interstices defined between the metal pieces constituting an engine room which houses an engine including an ignition system, therein. Yet furthermore, the aforesaid electromagnetic waves include a wide range of frequencies which adversely affect, as a source for noise radio waves, the receiving conditions of equipments having radio-wave receiving functions, such as a radio wave receiver, radio, television and the like which are located in the neighborhood of a vehicle. As a countermeasure against the noise radio waves or the electromagnetic waves of a radio frequency band, which exert adverse effect on radio equipments, the occurrence of noise radio waves is suppressed or the radiation of the radio waves causing the noise is suppressed in an attempt to prevent the adverse effect by the noise radio waves. In this respect, for minimizing noise radio waves, a noise suppressing resistor is built in an ignition system of a high tension circuit which uses a combination of a resistive plug, resistive high tension cable and a distributor rotor having a resistor. However, such an attempt fails to meet the success in eliminating the effect by the noise radio waves. As a result, it has been a common practice for achieving desired results in preventing the noise radio waves to take the design of receivers and the position of antenna into considerations, along with the preventive means against noise radio waves. Nevertheless, because of a wide frequency bands of a FM radio, such an attempt cannot necessarily meet a success, thus suffering from the tendency to be affected by the noise radio waves. Among other attempts to use a high tension cable, there is one, in which a high tension cable is cut and then a noise suppressing resistor is threaded therebetween. However, such a junction tends to be loosened during the service of a motor vehicle, resulting in a defective connection which then leads to the lowered engine performance without driver's knowledge or the failure in starting an engine. Included by attempts to suppress the radiation of the noise radio waves to the exterior are one in which the entire ignition system is housed in a metallic covering which is grounded, and one in which conductors are connected between the engine body of a motor vehicle and the chassis, between the chassis and the body of a motor vehicle or between the body of a motor vehicle and the respective parts. However, in the former case, the suppression of the radiation of the noise radio waves meets a success, while there results an extreme increase in production cost due to an increase in the number of parts used and an increase in man hours for connecting conductors. In addition, the provisions of the metallic covering and electric wires for use in grounding impair the efficiency of attaching and removing operations of those parts in the maintenance of a vehicle, hindering efficient maintenance to a great extent. For those reasons, the former attempt is not recommendable from viewpoints of prevention of noise radio waves. In the latter case, there is confronted an increase in the number of parts used and man hours required for assembly for connecting electrically conductive parts together by electric wires, while there is little increase in production cost, because of the absence of a metallic covering. However, although the latter case is effective in presenting the positive bodygrounding condition, it fails to shield the noise radio waves, with the resulting tendency to afford varying shielding effects for the respective vehicles. Thus, the latter case as well is not recommendable from viewpoints of the prevention of noise radio waves for mass-production type vehicles. Meanwhile, even if the latter is practiced as a preventive measure against the noise radio waves, there necessarily arises a need to use another noise radio-wave preventive means for inserting a noise suppressing resistor in the ignition system in combination therewith. Unfortunately, even such a combination meets a partial success, failing to achieve the effects of the former in the sense of preventing the noise radio waves.

It is a principal object of the present invention to provide a method and a device for effectively suppressing the leakage of noise radio waves radiated from an engine and the like in a motor vehicle.

It is another object of the present invention to provide a method and a device for suppressing the noise radio waves in a motor vehicle, which method and device present low production cost and are reliable.

It is a further object of the present invention to provide a method and a device for suppressing the noise radio waves, which method and device prevent the adverse effects on radio wave receivers equipped within or in the neighborhood of a motor vehicle, due to the noise radio waves radiated from an engine or the like.

According to the present invention, there are provided for achieving the aforesaid objects a method and a device for suppressing the noise radio waves radiated from an engine and the like in a motor vehicle by utilizing the principle which comprises the steps of determining the positions of interstices which minimize the quantity of magnetic fluxes of the noise radio waves which leak through the interstices defined between the body-skin forming members located in the neighborhood of the noise radio wave generating source such as an engine in a motor vehicle, and bonding the body-skin forming members together which oppose to each other through the medium of the interstices but in said positions minimizing the quantity of magnetic fluxes.

These and other objects and features of the present invention will be clear from the following more detailed description, taken in connection with the accompanying drawings which indicate several embodiments of the invention, in which.

Figure 1:
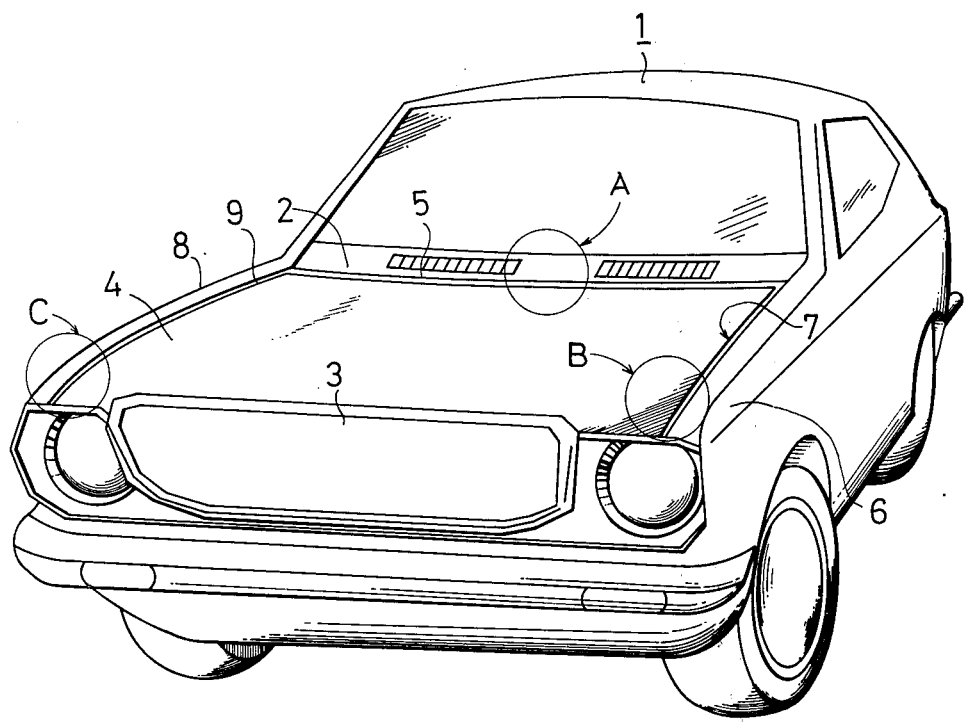
FIG. 1 is a perspective view of a motor vehicle presented as the first through the seventh embodiments of the invention.
Figure 7:
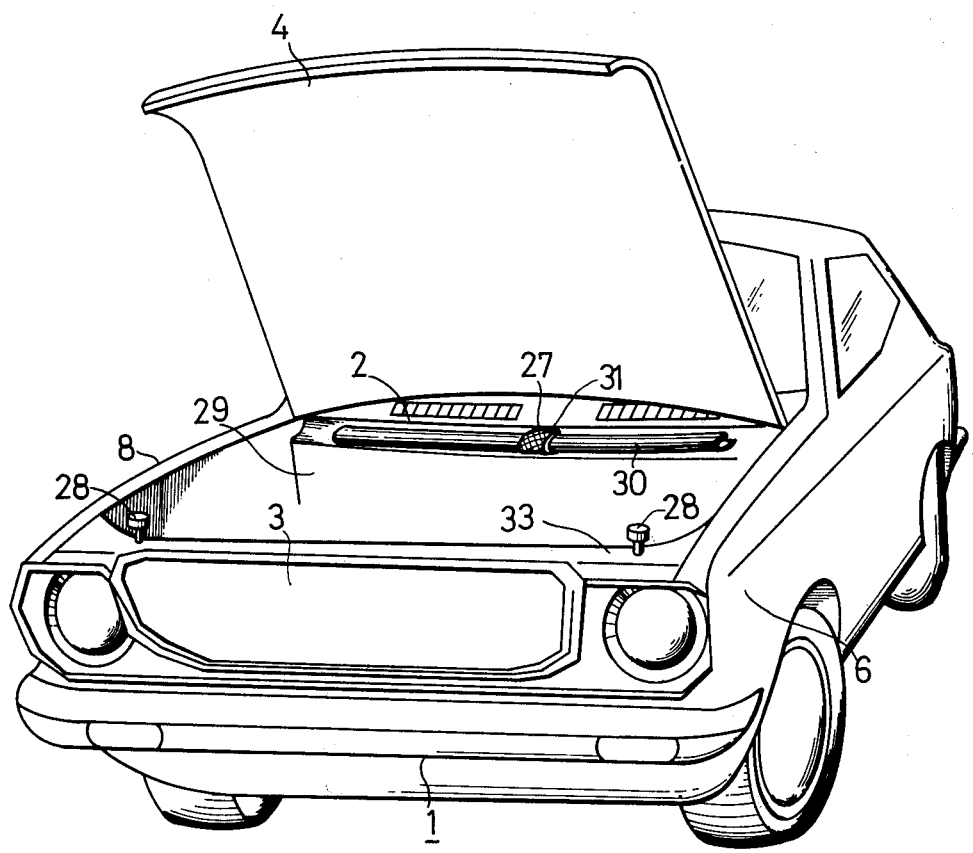
FIG. 7 is a perspective view of a motor vehicle in the first embodiment of the invention, showing a hood in its open position.

For simplicity of description, the description will be first referred to part of the arrangement which is common throughout the respective embodiments of the present invention, i.e., (i) component parts of a body front portion of a motor vehicle, (ii) respective interstices (FIG. 1), through which leak the noise radio waves from an engine including an ignition system, and (iii) a measuring device and a method therefor, by which to measure the current on the surface of a body (the quantity of leaking magnetic fluxes), which current primarily corresponds to intensity of the electric field of noise radio waves leaking outside a motor vehicle. Referring to FIG. 1, there is defined an interstice 5 between the hood 4 and a cowl top 2, the hood 4 being adapted to pivotally move on the side of a front 3 by means of a hinge provided on the side of cowl top 2 of a motor vehicle 1 (FIG. 7). In addition, there are defined an interstice 7 between the hood 4 and left-hand fender front 6, and an interstice 9 between the hood 4 and a right-hand fender front 8, respectively. In this respect, the noise radio waves from an engine leak through the aforesaid three interstices 5, 7, 9 as well as through the metallic portions close to the respective interstices 5, 7, 9. In this case, the quantity of magnetic fluxes of the noise radio waves leaking outside a motor vehicle through or along the interstices 5, 7, 9 is in proportion to the value of a surface current of a body, which current flows through the metallic portion close to the respective interstices 5, 7, 9. This phenomenon has been confirmed by the inventors by experiments and simulation by using a computor.

Figure 2:
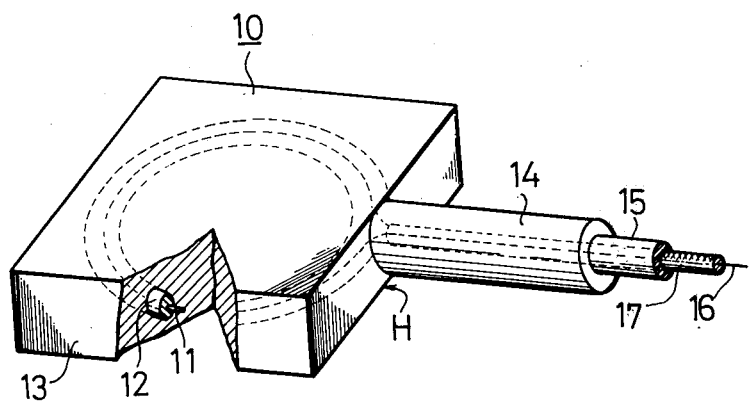
FIG. 2 is a perspective view of a probe for measuring the quantity of magnetic fluxes of leaking noise radio waves in the respective embodiments.
Figure 3:
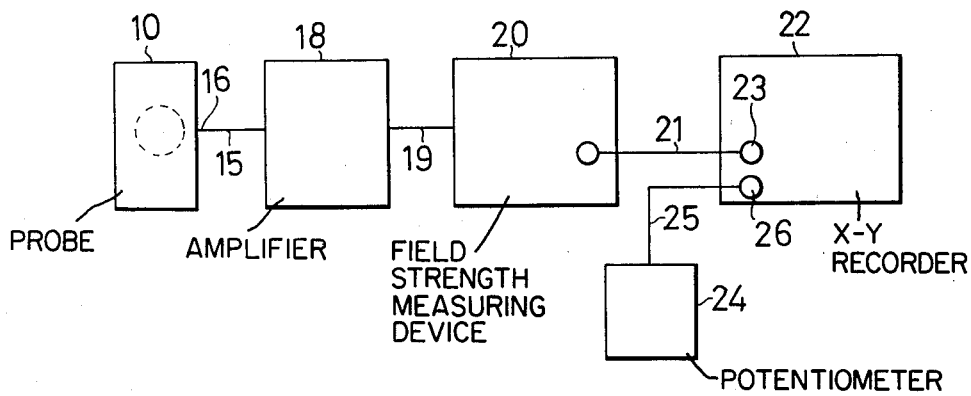
FIG. 3 is a diagram illustrating a magnetic flux measuring device for noise radio waves in the respective embodiments.

FIG. 2 shows a probe 10 adapted to measure the quantity of magnetic fluxes flowing along the respective interstices, the magnetic fluxes being created by noise radio waves from the engine. A probe coil 11 which generates a voltage of a level corresponding to the intensity of the noise radio waves (the quantity of magnetic fluxes) by responding to the noise radio waves is integrally formed with a probe body 13 made of a bakelite, in the condition where the coil 11 is protected by a polyethylene coating 12, while an internal lead wire 16 extending through a coaxial cable 15, which is attained to the end face of a columnar handle 14, is connected to one end of the probe coil 11 as an output terminal of the probe 10, while an external lead wire 17 of the coaxial cable 15 is connected to the other end of the prope coil 11 as a grounding wire. FIG. 3 shows a device for measuring the quantity of magnetic-fluxes of noise radio waves, which device amplifies the output of the probe 10 and has a meter indicating the value thus amplified. In addition, the output terminal 16 of the probe 10 is connected to the input terminal of a high-frequency-voltage amplifier 18 which amplifies a voltage induced to the probe coil 11, with the output terminal of the high-frequency-voltage amplifier 18 being connected by way of the coaxial cable 19 to the input terminal of a noise electric-field-strength-measuring device 20, whereby the voltage corresponding to the quantity of magnetic fluxes of noise radio waves induced to the probe coil 11 is read as an indication in the noise electric-field-strength-measuring device 20. The output of the noise electric-field-strength-measuring device 20 which generates an output voltage corresponding to the indication of the meter is connected by way of a lead wire 21 to a Y-input terminal 23 of a X-Y recorder 22. On the other hand, the output terminal of a potentiometer 24 which generates an output voltage corresponding to the positional variation of the probe 10, when the probe 10 is shifted from a given reference point, which has been set beforehand, is connected by way of a lead wire 25 to X-input terminal 26 of the X-Y recorder 22, whereby the quantity of the magnetic fluxes of noise radio waves is plotted on a recording sheet of the X-Y recorder 22 against the varying positions of the probe being shifted.

Figure 15:
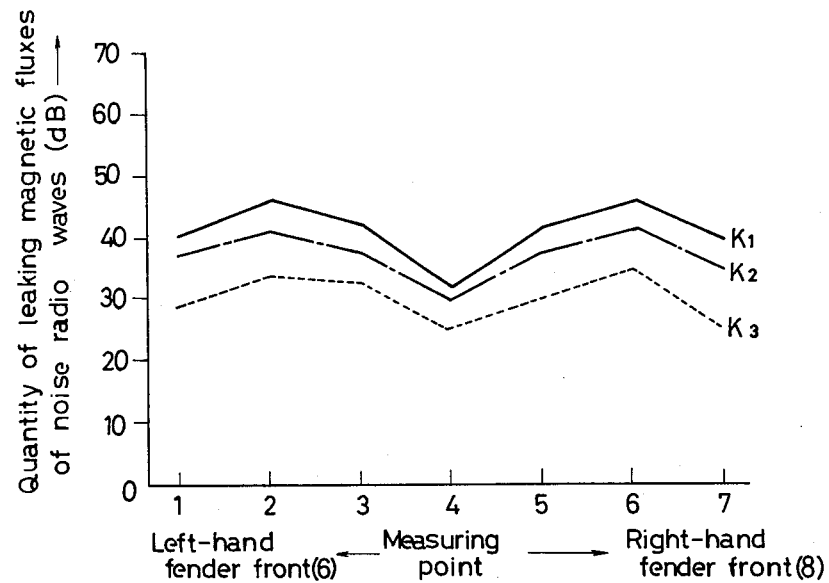
FIG. 15 is a plot showing the quantity of leaking magnetic fluxes of noise radio waves in connection with the interstices between the hood and the cowl top of a motor vehicle, in the first through the seventh embodiments of the invention.
Figure 16:
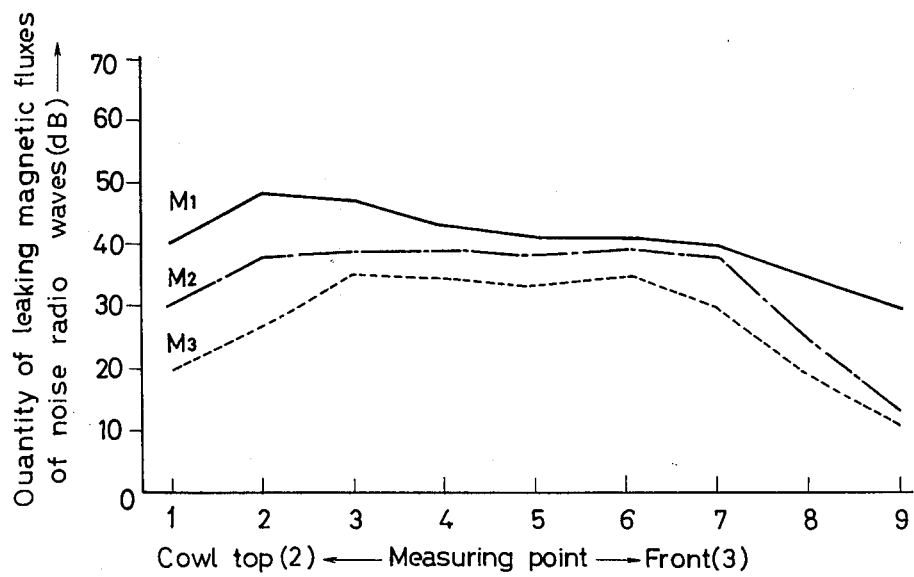
FIG. 16 is a plot showing the quantity of leaking magnetic fluxes of noise radio waves in relation to the interstices defined between the hood and the left-and right-hand fender fronts in a motor vehicle in the first through the seventh embodiments of the invention.

With the magnetic flux measuring device of the aforesaid arrangement, if the probe 10 is shifted along the respective interstices 5, 7, 9 with the undersurface of the probe 10 softly contacting the body of a vehicle (the surface H in FIG. 2) and yet with the center of the probe coil 11 being substantially in coincidence with the center line of the widths of the interstices 5, 7, 9 then the spacing between the probe coil 11 and the surface of the body may be maintained to a given value above the respective interstices 5, 7, 9. Then, when the probe 10 is shifted from the respective ends of the three interstices 5, 7, 9 to the other, then the quantity of the magnetic fluxes of noise radio waves which are being radiated through the respective interstices 5, 7, 9, or from the metallic portions of the body in the neighborhood of the interstices may be recorded in the X-Y recorder 22. In the conventional case where the occurrence of the noise radio waves is minimized merely by means of a noise suppressing resistor which was built in the ignition system of the motor vehicle 1, quantity of the magnetic fluxes of noise radio waves per interstice 5 was measured as indicated in the line K1 in FIG. 15. by the X-Y recorder 22, while the line M1 in FIG. 16 represents the quantities of the magnetic fluxes (measured also by the X-Y recorder 22) flowing through the interstices 7 and 9. As a result of the measurements, it was confirmed that the positions of interstices, which minimize the quantity of magnetic fluxes of noise radio waves, when measured through the respective interstices, fall within a circle (A in FIG. 1) which has a radius of 20 cm and its center in the center axis of the motor vehicle, in the case of the interstice 5, and within circles (B and C in FIG. 1) which have radii of 20 cm and their center located 20 cm rearward of the leading edges of the body surfaces on the side of the front 3, in the cases of the interstices 7 and 9.

It should be noted that the present invention features the step of bonding together those surfaces of the body, which oppose to each other across the respective interstices 5, 7, 9 in the positions within a circle (A) having a radius of 20 cm and its center in the center axis of a motor vehicle, in the case of the interstice 5, and in the positions within circles (B), (C) which have a radius of 20 cm and are located 20 cm rearwards of the leading edge of the body surfaces on the side of the front 3, in the cases of the interstices 7 and 9, i.e., the features of the invention lies in bonding together the surfaces of the body which are located in the positions which present the minimum quantity of magnetic fluxes of noise radio waves, when measured according to the aforesaid measuring method. In this respect, the term, "bonding" as used herein is meant by the connection of one body surface to another in the high-frequency-electrical relation.

Description will now be given of the respective embodiments of the invention.

Figure 4:
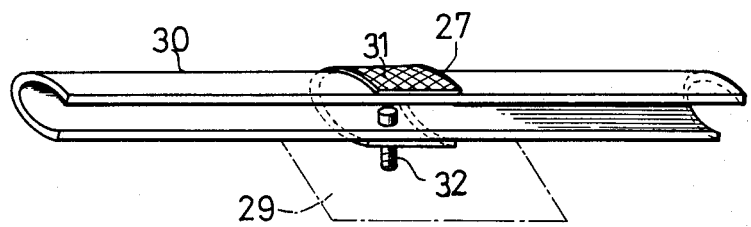
FIG. 4 is a perspective view of a bonding means used in the first embodiment of the invention.
Figure 6:
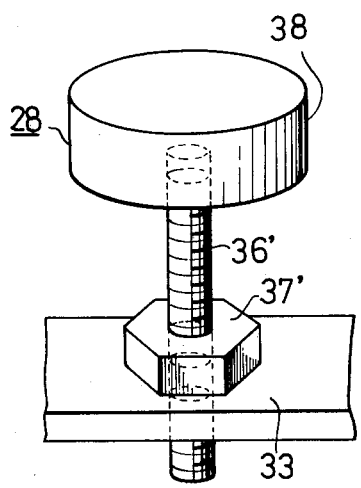
FIG. 6 is a perspective view of another bonding means used in the first embodiment of the invention.

The first embodiment of the invention uses a bonding means 27, shown in FIG. 4, for the interstice 5 in a motor vehicle 1, and a bonding means 28, shown in FIG. 6, for the interstices 7, 9. Referring to FIG. 7, there is shown the bonding means 27 of FIG. 4. A cowl top seal 30 made of rubber and having a 'U' shape in its cross section is attached, as shown in FIG. 7, to the top surface of a dash panel spot-welded to the cowl top 2, in line with the interstice 5. When the hood 4 is closed, the cowl top seal 30 is deflected and urged against the back surface of the hood 4. Covering a portion of the outer periphery of the cowl top seal 30 which faces the center portion of a vehicle is a plain stitch tin-plated copper wire 31 of dimensions of 1.6 cm wide, 0.35 cm thick and 15 cm long, the specification of the copper wire 31 being such that the diameter of the core wires is 0.26 mm, the number of core wires is 11, and the number of the strand wires in its cross section is 24. The plain stitch tin-plated copper wire 31 is secured to the dash panel 29 from inwards, together with the cowl top seal 30 by means of a screw 32. Accordingly, the plain stitch tin-plated copper wire 31 is connected by way of part of the dash panel 29 to the cowl top 2 in electrically conductive relation. Then, if the hood 4 is closed under the above condition then the plain stitch tin-plated copper wire 31 is connected to a hood 4 through the medium of the coating of a dielectric material (such as paint) coated on the hood 4 in a capacitive coupling relation.

Figure 5:
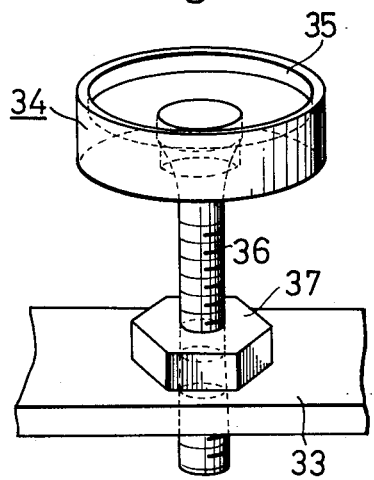
FIG. 5 is a perspective view of a bumper of the conventional type.

Next, description will be turned to the bonding means 28 by referring to FIG. 6. A pair of bumper means 34, one of which is shown in FIG. 5, which absorb an impact exerting on the hood 4 when the hood is closed, are secured to the top surface of a front fender supporting member at the left-and right-hand ends thereof. More particularly, secured to the top surface of the front fender supporting member 33 is a bolt 36, having an impact-absorbing rubber bumper body 35, which is secured to the head of the bolt 36 by means of a nut 37, thereby adjusting the height of the bumper body 35. The bonding means 28 shown in FIG. 6, replaces the bumper body 35 of the bumper means shown in FIG. 5 by the metallic disc 38 of 5 mm thick and 24 mm in radius, while the disc 38 is secured in its center portion to the end of the bolt 36' at a right angle thereto, with the other end of the bolt 36' being threaded into the front fender supporting member 33. In this case, the height of the disc 38 is so adjusted by means of the bolt 36' and nut 37' that in the condition where the hood 4 is closed, the back surface of the hood 4 contacts the top surface of the disc 38. Accordingly, the disc 38 is electrically conductively connected to the left- and right-hand fender fronts 6, 8 by way of part of the front fender supporting member 38. In this respect, if the hood 4 is closed under the above condition, then the disc 38 is connected to the hood 4 through the medium of the coating 65 of a dielectric material in capacitive coupling relation.

Now, description will be given of the results of the measurements of the quantities of magnetic fluxes of noise radio waves for the respective interstices 5, 7, 9 in case the bonding means 27, 28 are attached to a motor vehicle, while referring to the prior art countermeasure for comparison purpose.

Figure 17:
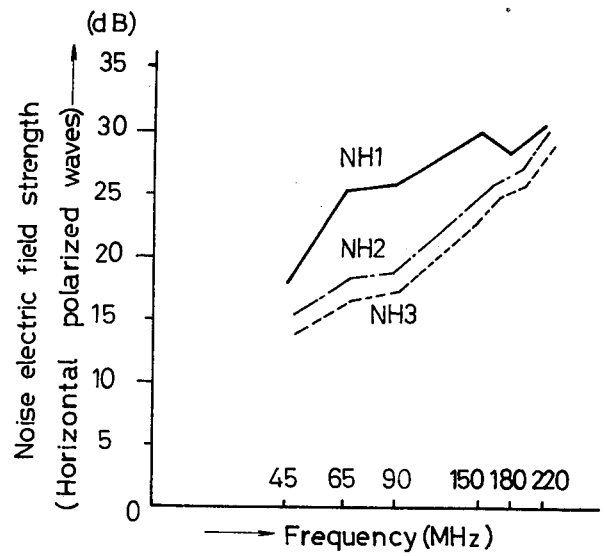
FIG. 17 is frequency characteristic curves of noise radio waves radiated outside a motor vehicle in the first through the seventh embodiments of the invention, representing horizontal polarized waves.
Figure 18:
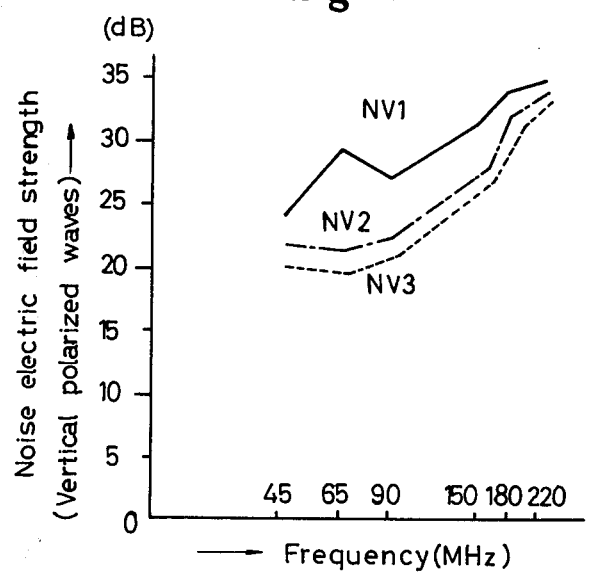
FIG. 18 is frequency characteristic curves of noise radio waves radiated outside a motor vehicle, which are similar to that given in FIG. 17, representing the vertical polarized waves.

Firstly, measurements were taken for the quantities of the noise radio waves through the respective interstices 5, 7, 9 in the conventional case where a noise suppressing resistor is built in the ignition system of the motor vehicle 1 and yet only the bonding means 28 is attached to the vehicle 1. The quantities of the magnetic fluxes measured by the X-Y recorder for the interstice 5 are given as a line K2 in FIG. 15, while the quantities of the magnetic fluxes for the interstices 7, 9 are given as a line M2 in FIG. 16. This reveals that the quantity (K2) of the magnetic fluxes of noise radio waves through the interstice 5 is reduced by 3dB to 5dB, as compared with the quantity K1 of the magnetic fluxes in a conventional motor vehicle which is devoid of the bonding means 28, while the quantity (M2) of the magnetic fluxes through the interstices 7, 9 as well is reduced by 5dB to 15dB, as compared with the quantity (M1) of the magnetic fluxes in a conventional vehicle. As to the characteristics of the electric-field strength per frequency, of the noise radio waves (This will be referred to as "a noise-radio-wave frequency characteristic", hereinafter), the horizontally polarized wave as well as the vertically polarized wave are reduced by 3dB to 6dB, as compared with the noise-radio-wave frequency characteristic, represented by the line NH1 in FIG. 17 (The line NH will refer to the horizontally polarized wave, hereinafter) and the characteristic which is represented by the line NV1 in FIG. 18, as in the case of NH2 and NV2 which represent the noise-radio-wave frequency characteristics of motor vehicles which use only the bonding means 28.

Next, the measurements were taken for the quantities of the noise radio waves through the respective interstices 5, 7, 9 in case both the bonding means 27 and 28 were attached to a motor vehicle 1, in which as in the case of the previous conventional countermeasure, a noise suppressing resistor is built in the ignition system of a motor vehicle 1. The quantities of the magnetic fluxes measured by the X-Y recorder 22 for the interstice 5 are given as a line K3 in FIG. 15, while the quantities of the magnetic fluxes through the interstices 7, 9 are given as a line M3 in FIG. 16. The results are such that the quantity (K3) of the magnetic fluxes of the noise radio waves through the interstice 5 is proved to have been reduced by 5dB to 15dB, as compared with the case where only the bonding means 28 is attached to a vehicle, to which has been applied a conventional countermeasures, and as high as 8dB to 20dB, as compared with the vehicle, to which has been applied only conventional countermeasures. On the other hand, the quantity (M3) of the magnetic fluxes of noise radio waves through the interstices 7, 9 as well is reduced by 3dB to 10dB, as compared with the case where only the bonding means 28 is attached to a motor vehicle, to which has been applied conventional countermeasure, and by as high as 8dB to 20dB, as compared with a motor vehicle, to which has been applied only conventional countermeasure. Likewise, the noise-radio-wave frequency characteristic is reduced by 3dB to 5dB as shown by the line NH3 in FIG. 17 and the line NV3 in FIG. 18, as compared with the cases represented by the line NH2 in FIG. 17 and the line NV2 in FIG. 18, wherein only the bonding means 28 is attached to a vehicle, to which has been applied a conventional countermeasure, while the horizontally polarized wave as well as the vertically polarized wave are reduced by as high as 6dB to 15dB, as compared with the vehicle, to which has been applied only a conventional countermeasure.

As is apparent from the foregoing, the bonding means 27, 28 given in the first embodiment of the invention may effectively suppress the leakage of noise radio waves, while retaining the functions of the cowl top seal 30 and bumper means 34 attached to the conventional motor vehicle 1, and yet may eliminate an increase in the number of parts used and an increase in man hours required for assembly. Yet furthermore, the bonding means according to the present invention need not be removed at the time of maintenance of the ignition system of the motor vehicle 1, such as for instance, the metallic covering in the conventional ignition system, while the noise-radio-wave-suppressing function may be retained for a long period of time, because of the high mechanical strength of bonding means, presenting high reliability from mechanical and performance viewpoints.

Figure 8:
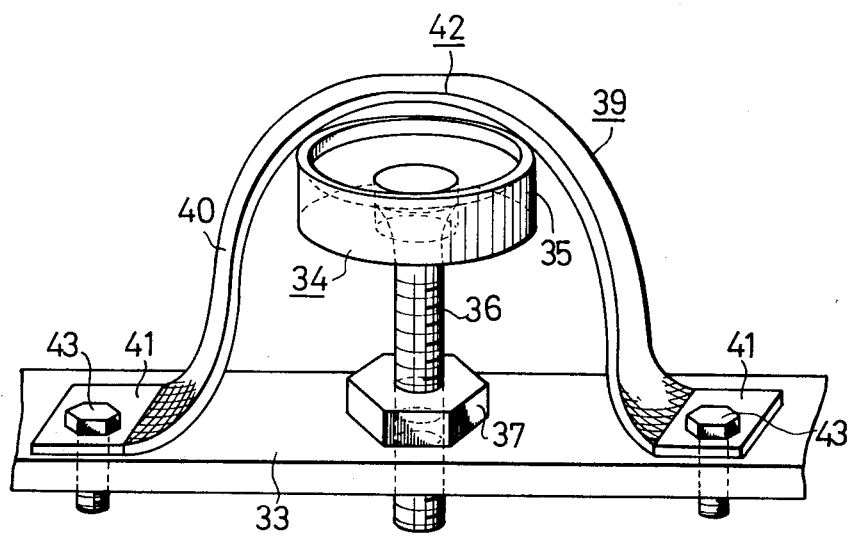
FIG. 8 is a perspective view of a bonding means used in the second embodiment of the invention.
Figure 9:
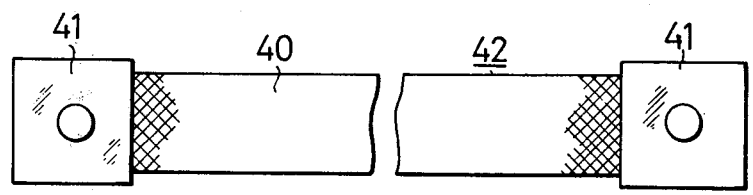
FIG. 9 is a plan view of a plain stitch tin-plated copper wire 42 used in the second embodiment of the invention.

The second embodiment of the invention refers to the case where, as in the case of the first embodiment, the bonding means 27 shown in FIG. 4 is used for the interstice 5 in a motor vehicle 1, while the bonding means 39 shown in FIG. 8 is used for the interstices 7, 9. Referring to the bonding means 39 shown in FIG. 8, a pair of bumper means 34 adapted to absorb the impact exerting on the hood 4 upon the closure of the hood 4, are attached to the top surface of the front fender supporting member 33 at the left-and right-hand ends thereof, as shown in the first embodiment of FIG. 6. Attached to the front fender supporting member 33 by means of a bolt 43 in an arcuate fashion, as shown in FIG. 8, is a plain stitch tin-plated copper wire 42 shown in FIG. 9 which is of the dimensions of 1.6 cm wide, 0.35 cm thick, and 12 cm long, while its specification is such that the diameter of the core wire is 0.26 mm, the number of the core wire is 11 and the number of the strand wires in its cross section is 24, with terminal strips 41 being attached to the opposite ends thereto. Under the aforesaid condition, the electric wire portion 40 of the plain stitch tin-plated copper wire 42 covers the top surface of the bumper means 34 as shown in FIG. 8.

Accordingly, by attaching the bonding means 27, 39 to the motor vehicle 1, both the plain stitch tin-plated copper wire 31 and the cowl top 2 are connected together by way of part of the dash panel 29 in electrically conductive relation, while the plain stitch tin-plated copper wire 42 and the left-and right-hand fender fronts 6, 8 are coupled together by way of part of the front fender supporting member 33 in electrically conductive relation. Thus, if under such a condition the hood 4 is closed, then the plain stitch tin-plated copper wire 42 is connected by way of the bolt 43 and part of the front fender supporting member 33 to the left- and right-hand fender fronts 6, 8 in electrically conductive relation. On the other hand, in case the hood 4 is closed under such a condition, then the plain stitch tin-plated copper wire 31 is connected to the hood 4 through the medium of the coating 65 of a dielectric material in capacitive coupling relation, while the plain stitch tin-plated copper wire 42, as well, is connected the hood 4 through the medium of coating 65 of a dielectric material in capacitive coupling relation.

Next, the quantities of the magnetic fluxes of the noise radio waves through the respective interstices in case the bonding means 27, 39 are attached to the motor vehicle 1, along with the conventional countermeasures, are substantially the same as those in the first embodiment, and so are the functions and advantages of the second embodiment except that, when the hood 4 is closed, the coating on the black surface of the hood 4 is hardly injured by the plain stitch tin-plated copper wire 42, because the bumper body 35 is deflected thereby, and that the plain stitch tin-plated copper wire 42 may be more positively connected to the hood in capacitive coupling relation.

Figure 10:
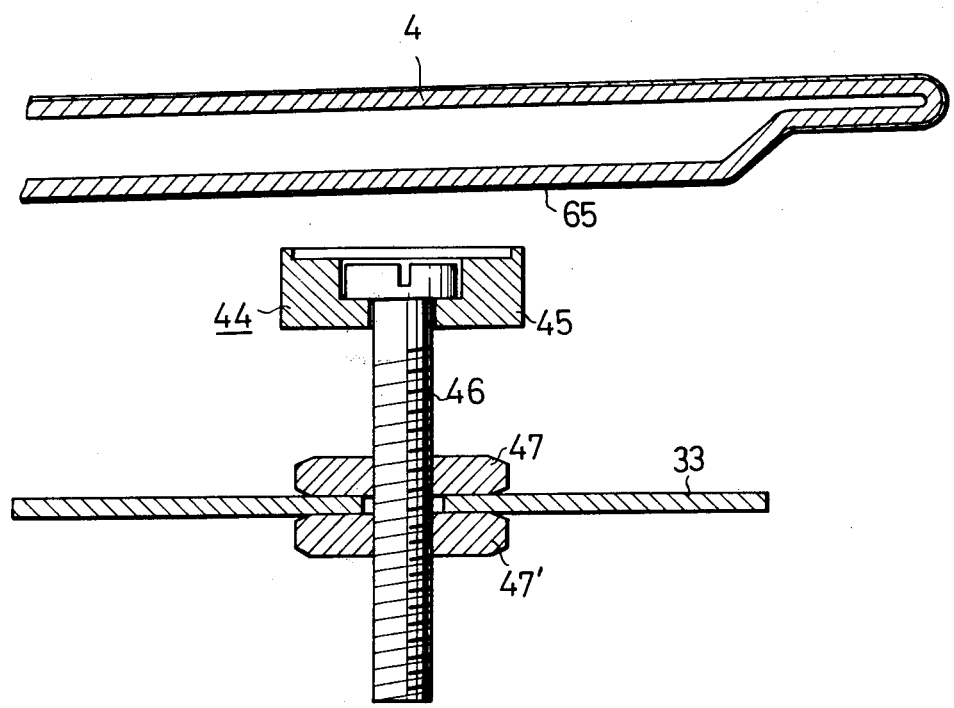
FIG. 10 is a cross sectional view of a bonding means used in the third embodiment of the invention.

The third embodiment of the invention refers to the case where, as in the preceding embodiments, the bonding means 27 shown in FIG. 4 is used for the interstice 5 in the motor vehicle 1, while the bonding means 44 shown in FIG. 10 is used for the interstices 7, 9. Referring to the bonding means 44 in FIG. 10, attached to the top surface of the front fender supporting member 33 of the motor vehicle 1 at its left-and right-hand ends are a pair of bolts 46, to which are secured on its head bumper bodies 45 of electrically conductive rubber which contains metal powder (such as iron powder) therein, the bolts 46 being adapted to adjust the height of the bumper body 45 and secured to the front fender supporting member 33 by means of nuts 47, 47'. The height of the bumper body 45 is so adjusted that, in the closed condition of the hood 4, the back surface of the hood 4 is urged under pressure against the top surface of the bumper body 45.

Accordingly, by attaching the bonding means 27, 44 to the motor vehicle 1, the plain stitch tin-plated copper wire 31 is connected by way of part of the dash panel 29 to the cowl top 2 in electrically conductive relation, as in the preceding embodiments, while the bumper body 45 is connected by way of part of the bolt 46 and part of the front fender supporting member 33 to the left-and right-hand fender fronts 6, 8 in electrically conductive relation. On the other hand, when the hood 4 is closed under such a condition, then the plain stitch tin-plated copper wire 31 is connected to the hood 4 through the medium of the coating 65 of a dielectric material in capacitive coupling relation, while the bumper body 45 is connected to the hood 4 through the medium of coating 65 of a dielectric material in capacitive coupling relation.

Meanwhile, the quantities of the magnetic fluxes of the noise radio waves through the respective interstices 5, 7, 9 in case the bonding means 27, 44 are attached to the motor vehicle, along with the conventional countermeasure, in the third embodiment, are substantially the same as those given in the preceding embodiments, and the function and advantages thereof are the same as those of the first embodiment except that, when the hood 4 is closed, the coating 65 on the back surface of the hood 4 is injured by the bumper body 45 and that the bumper body 45 may be more positively connected to the hood 4 in capacitive coupling relation.

Figure 11:
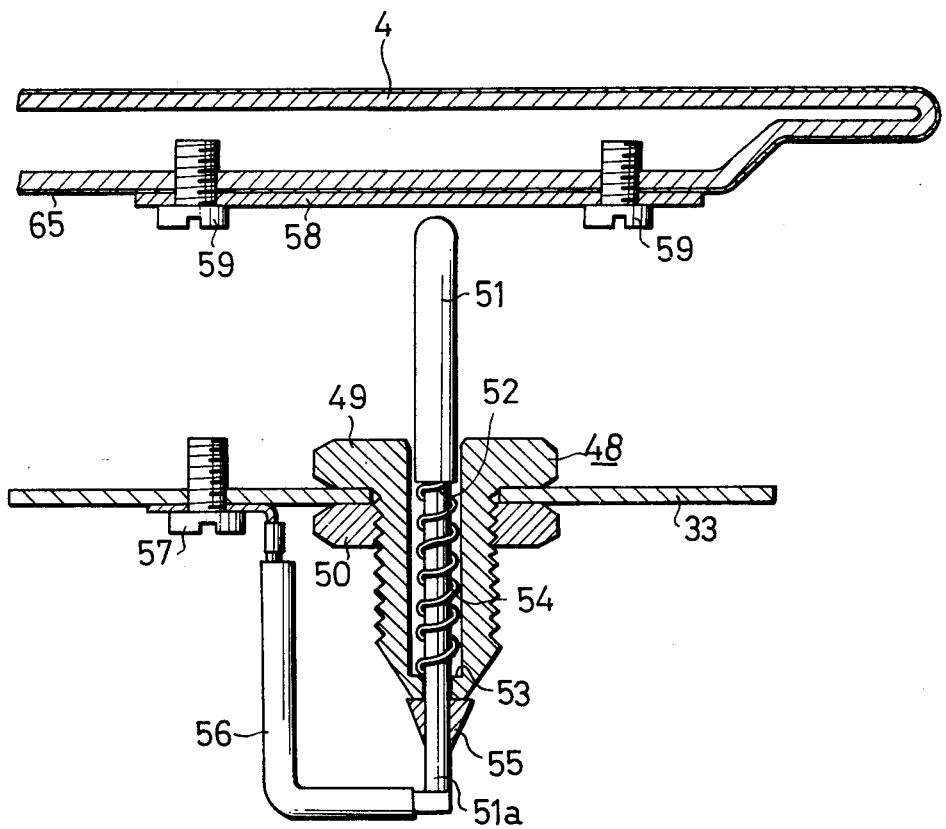
FIG. 11 is a cross sectional view of another bonding means used in the fourth embodiment of the invention.

The fourth embodiment refers to the case where, as in the preceding embodiments, the bonding means 27 shown in FIG. 4 is attached to the motor vehicle 1 for the interstice 5, while the bonding means 48 shown in FIG. 11 are used for the interstices 7, 9. Referring first to the bonding means 48, a pair of sleeves are attached to the top surface of the front fender supporting member 33 at its left-and right-hand ends by means of nuts 50, with a connecting rod 51 of an electrically conductive material being placed through the sleeve 49 in vertically movable relation. Confined between a shoulder portion 53 in the sleeve 48 and a shoulder portion 52 in the connecting rod 51 is a compression spring 54 in a manner that the connecting rod 51 is loaded so as to be urged upwards by means of the spring 54, while a stopper 55 is secured to the lower portion of the connecting rod 51 for the purpose of limiting the vertical position of the connecting rod 51 by abutting the undersurface of the sleeve 49. Attached to the lower end 51a of the connecting rod 51 is one end of a vinyl coated electric wire 56, while the other end of the wire being secured to the front fender supporting member 33 by means of a bolt 57. Secured to such a portion of the back surface of the hood 4, which faces the tip of the connecting rod 51, by means of screws 59 is an aluminum disc 58 of dimensions of 1 mm thick, and over 20 mm in diameter. When the hood 4 is closed under such a condition, then the connecting rod 51 is depressed against the spring action of the spring 54 by means of the hood 4.

Accordingly, by attaching the bonding means 27, 48 to the motor vehicle 1, the plain stitch tin-plated copper wire 31 is connected by way of part of the dash panel 29 to the cowl top 2 as in the preceding embodiments, while the connecting rod 51 is connected to the left-and right-hand fender fronts 6, 8 in electrically conductive relation by way of the vinyl coated electric wire 56, bolt 57 and part of the front fender supporting member 33. In addition, when the hood 4 is closed under such a condition, the plain stitch tin-plated copper wire 31 is connected to the hood 4 through the medium of coating 65 of a dielectric material in capacitive coupling relation, while the connecting rod 51 is connected to the hood 4 through the medium of disc 58 and screw 59 in electrically conductive relation.

The quantities of the magnetic fluxes of the noise radio waves for the respective interstices 5, 7, 9 in case the bonding means 27, 48 are attached to the motor vehicle 1, along with the conventional countermeasure, are substantially the same as those in the preceding embodiments, and the function and advantages of the fourth embodiment are almost the same as those of the first embodiment, except that even if there is a variation in the spacing between the back surface of the hood 4 and the top surface of the front fender supporting member 33, due to the deflection of the hood 4, there may be maintained a consistent electrically conductive condition between the hood 4 and left-and right-hand fender fronts 6, 8 without adjusting the height of the connecting rod 51 for the respective vehicles, and that the leakage suppressing characteristics of the noise radio waves may be maintained substantially constant throughout the entire vehicles.

Figure 12:
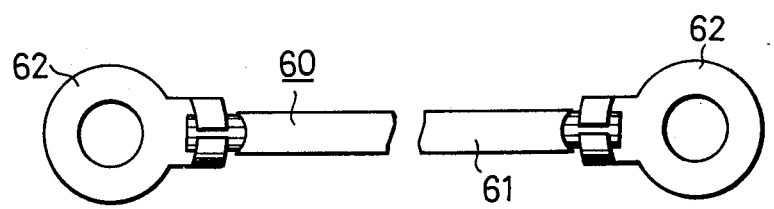
FIG. 12 is a plan view of a bonding means used in the fifth embodiment of the invention.
Figure 13:
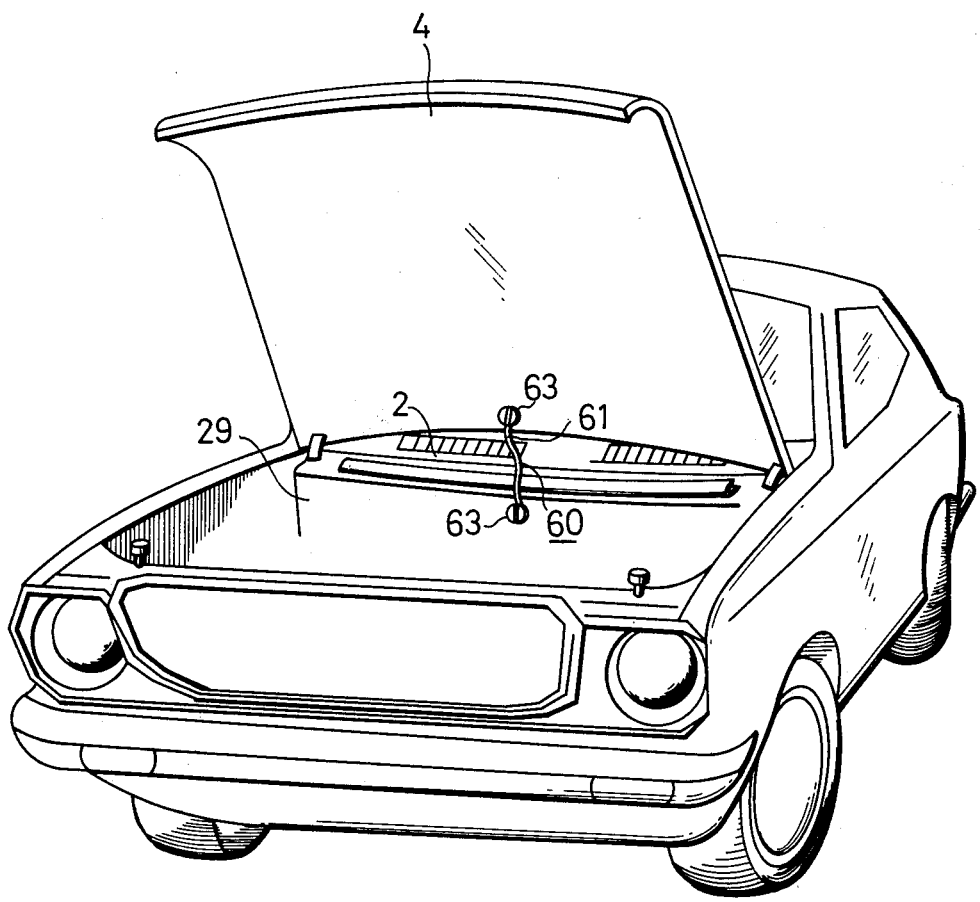
FIG. 13 is a perspective view of a motor vehicle equipped with the bonding means of FIG. 12.

The fifth embodiment of the invention refers to the case where the bonding means 60 shown in FIG. 12 is used for the interstice 5 in a motor vehicle 1, while one of the bonding means 28, 39, 44, 48 used in the preceding embodiments is used for the interstices 7, 9. Referring first to the bonding means 60, secured to the back surface of the hood 4 in the center axis of the vehicle 1 and the top edge portion of the dash panel 29 by means of screws are terminal strips 62 (FIG. 12) which are attached to the opposite ends of the vinyl coated electric wire 61. In this respect, the length of the vinyl coated electric wire 61 is so adjusted as to cover a minimum distance between the hood 4 and the dash panel 2 in the open condition of the hood 4. (FIG. 13)

Accordingly, by attaching the bonding means 60 to the motor vehicle 1, in the open or closed condition of the hood 4, the hood 4 is connected to the cowl top 2 by way of screw 63, vinyl-coated electric wire 61 and part of the dash panel 29 in electrically conductive relation.

Meanwhile, the quantities of the magnetic fluxes of the noise radio waves through the respective interstices in case one of the bonding means 28, 39, 44, 48 is attached to the motor vehicle 1, along with the conventional countermeasure, are substantially the same as those in the preceding embodiments of the invention, and the function and advantages of the fifth embodiment are the same as those of the first embodiment except that there may be achieved readiness in attaching the bonding means 60 to the motor vehicle and that the noise-radio-wave-preventive measure may readily be applied to vehicles in service.

The sixth embodiment of the invention refers to the case where the bonding means 48 shown in FIG. 11 is used for the interstice 5 in a motor vehicle 1, while one of the bonding means 28, 29, 44, 48 is used for the interstices 7, 9. In this respect, the bonding means 48 is attached both to the top surface of the dash panel 29 and to the back surface of the rear end portion of the hood 4, in the center axis of the vehicle 1. Accordingly, the connecting rod 51 is connected to the cowl top 2 by way of a vinyl coated electric wire 56, bolt 57 and part of the dash panel 29 in electrically conductive relation. Furthermore, when the hood 4 is closed under such a condition, then the connecting rod 51 is connected to the hood 4 by way of disc 58 and screw 59 in electrically conductive relation. In passing, in the case of the sixth embodiment, it is advantageous from performance viewpoints to attach an aluminum sheet of 1 mm thick, and 1.6 mm wide and 10 cm long, in place of the disc 58.

Meanwhile, the quantities of the magnetic fluxes of the noise radio waves through the respective interstices 5, 7, 9 in case the bonding means given in the sixth embodiment is attached to a motor vehicle 1, along with the conventional countermeasure, are substantially the same as those of the preceding embodiments, and the function and advantages of the sixth embodiment are the same as those obtained in the preceding fourth embodiment.

Next, the seventh embodiment of the invention refers to the case where the bonding means having an electrically conductive connecting plate containing iron powder and having the same outer configuration as that of the plain stitch tin-plated copper wire 31 is used for the interstice 5, in place of the plain stitch tin-plated copper wire 31 of the bonding means 27 as used in the first through the fourth embodiments, while one of the bonding means 28, 39, 44, 48 used in the preceding respective embodiments for the interstices 7, 9 is used. With the bonding means attached across the interstice 5, the connecting plate is connected to the cowl top 2 in electrically conductive relation by way of the screw 32 and part of the dash panel 29, while the connecting plate is connected to the hood 4 through the medium of coating 65 of a dielectric material in a capacitive coupling relation, in the closed condition of the hood 4.

Meanwhile, the quantities of the magnetic fluxes of the noise radio waves through the respective interstices 5, 7, 9 in case the bonding means having a connecting plate and one of the bonding means 28, 39, 44, 48 are attached to a motor vehicle 1, together with the conventional countermeasure, are substantially the same as those of the preceding respective embodiments, and the function and advantages of the seventh embodiment are the same those of the third embodiment.

Figure 14:
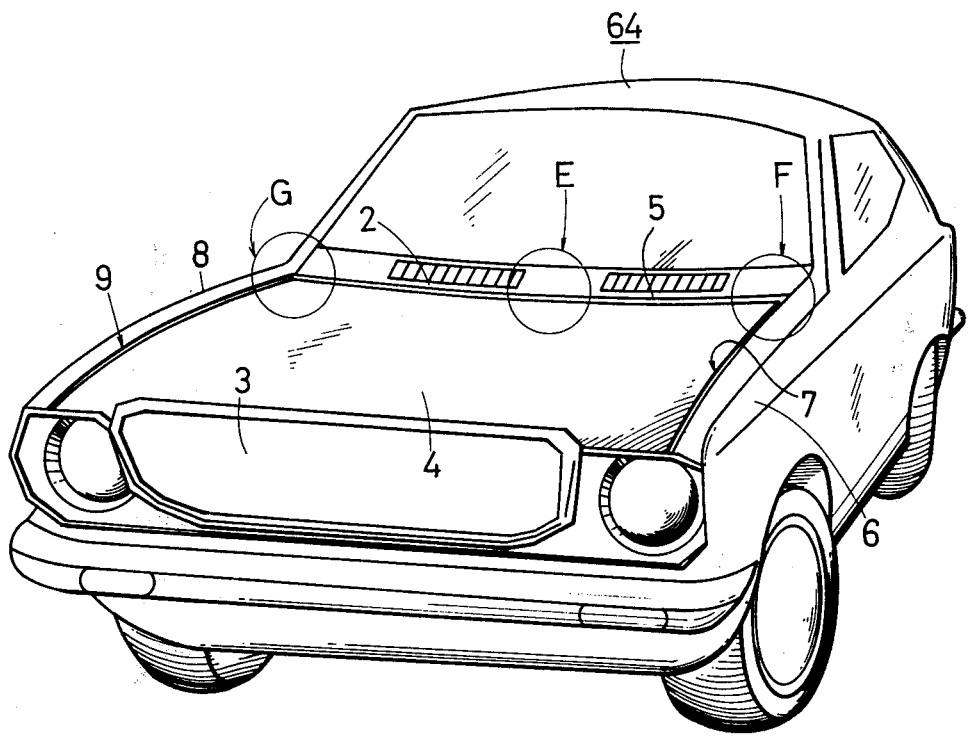
FIG. 14 is a perspective view of a motor vehicle given in the eighth embodiment of the invention.

Description has been thus given of the respective embodiments by referring to the motor vehicle of the type, in which the hood 4 is opened or closed on the side of the front 3 by means of a hinge placed on the side of the cowl top 2. However, the eighth embodiment of the invention refers to a motor vehicle 1 shown in FIG. 14, in which the hood 4 is opened and closed on the side of the cowl top 2 by means of a hinge provided on the side of the front 3. In this case, the quantities of the magnetic fluxes of noise radio waves through the respective interstices 5, 7, 9 were measured in the same manner as in the preceding respective embodiments. As shown at E, F, G in FIG. 14, the portions of interstices presenting minimum measurements fall within a circle (E) having a radius of 20 cm and its center in the center axis of a vehicle, in the case of interstice 5 and within circles (F), (G) having their centers at the opposite edges of the hood 4 on the side of the cowl top 2, and radius of 20 cm, in the cases of the interstices 7, 9. In this case, as well, the bonding means are applied across the respective positions of interstices presenting minimum measurements, i.e., in the center portion of the vehicle in the case of the interstice 5, and across the left-and right-hand opposite edges of the hood 4 on the side of the cowl top 2 in the cases of the interstices 7, 9 as in the cases of the first through seventh embodiments of the invention, so that the function and advantages the same as those of the respective preceding embodiments may be achieved in the eighth embodiment.

Now, description will be turned to the noise-radio-wave-suppression functions of the present invention. It is thought that, by bonding together the opposing surfaces of a body of a vehicle through the medium of a portion of interstices, which give the minimum value of the leaking noise waves, in the neighborhood of an engine room or in the neighborhood of the aforesaid positions, the high frequency current which flows through the surface of the body is changed into an current having a considerable loss such as an ohmic loss. Therefore, the energy of electromagnetic waves is considered to be converted into heat energy, thus suppressing the intensity of harmful noise radio waves.

It will be understood that the above description is merely illustrative of preferred embodiments of the invention. Additional modifications and improvements utilizing the discoveries of the present invention can be readily anticipated by those skilled in the art from the present disclosure, and such modifications and improvements may be fairly presumed to be within the scope of the invention as defined by the claims that follow.

What we claim is:

1. A method of suppressing noise radio waves in a motor vehicle, comprising the steps of: determining the positions of interstices defined between
    surface defining members of the body of said vehicle which exhibit a minimum quantity of the magnetic fluxes of said noise radio waves leaking through said interstices, said members being located in the neighborhood of a noise radio wave generating source, such an an engine mounted on said motor vehicle; and
    bonding together said surface defining members which oppose each other through said interstices at said positions which exhibit said minimum quantity of magnetic fluxes.

2. A method of suppressing noise radio waves as defined in claim 1, comprising bonding together said surface defining members of said body, which oppose each other through said interstices, in electrically conductive relation.

3. A method of suppressing noise radio waves as defined in claim 1, comprising bonding together said surface defining members of said body, which oppose each other through said interstices, in capacitive coupling relation.

4. Apparatus for suppressing noise radio waves in a motor vehicle, comprising bonding means which bond together surface defining members of a body of said motor vehicle at positions which exhibit a minimum quantity of magnetic fluxes of noise radio waves leaking through interstices defined between the surface defining members of the body when said surface defining members are not bonded together, said surface defining members being located in the neighborhood of a noise radio wave generating source, such as an engine mounted on said motor vehicle.

5. Apparatus for suppressing noise radio waves as defined in claim 4, wherein one end of said bonding means is connected to one of said surface defining members in electrically conductive relation and the other end of said bonding means is connected to another of said surface defining members in capacitive coupling relation.

6. Apparatus for suppressing noise radio waves as defined in claim 5, wherein said bonding means comprises a plain stitch tin-plated copper wire which partially covers the outer peripheral surface of a cowl seal in said motor vehicle, and a member which secures said plain stitch tin-plated copper wire to a dash panel of said vehicle in electrically conductive relation, whereby said plain stitch tin-plated copper wire is connected through said dash panel to the cowl in electrically conductive relation, and in the closed condition of a hood of said vehicle said copper wire is connected to said hood in capacitive coupling relation through a coating of dielectric material applied to the surface of said hood.

7. Apparatus for suppressing noise radio waves as defined in claim 5, wherein said bonding means comprises a metallic disc, a bolt secured to said disc in its center and a nut which secures said bolt to a front fender supporting member of said motor vehicle by being tightened, whereby said bonding means is connected to the hood of said vehicle in capacitive coupling relation through a coating of dielectric material applied to the surface of said hood.

8. Apparatus for suppressing noise radio waves as defined in claim 5, wherein said bonding means comprises a plain stitch tin-plated copper wire having terminal plates at both ends thereof and means for coupling said terminal plates to a front fender supporting member of said vehicle in electrically conductive relation, said plain stitch tin-plated copper wire having an arcuate center portion, the back surface of which is supported by the top surface of a bumper means secured to said front fender supporting member, whereby said plain stitch tin-plated copper wire is connected to said front fender supporting member is electrically conductive relation, and in the closed condition of a hood of said vehicle said copper wire is connected to said hood in capacitive coupling relation through a coating of dielectric material applied to the surface of said hood.

9. Apparatus suppressing noise radio waves as defined in claim 5, wherein said bonding means comprises a bolt, a bumper body made of electrically conductive rubber containing metal powder therein, said bumper body being secured to the head of said bolt, and a nut which secures said bolt to a front fender supporting member of said vehicle, whereby said bonding means is connected through said front fender supporting member to a front fender in electrically conductive relation, and in the closed condition of a hood of said vehicle said bonding means is connected to said hood in capacitive coupling relation through a coating of dielectric material applied to the surface of said hood.

10. Apparatus for suppressing noise radio waves as defined in claim 5, wherein said bonding means comprises a sleeve attached to a front fender supporting member in the motor vehicle, a connecting rod which extends through said sleeve and is axially movable therein, an electric wire connecting one end of said connecting rod to said front fender supporting member in electrically conductive relation and a compression spring loading said connecting rod, whereby in the closed condition of a hood said connecting rod is depressed against the action of said compression spring by said hood, while said connecting rod is connected to said hood in capacitive coupling relation through a coating of dielectric material applied to the surface of said hood.

11. Apparatus for suppressing noise radio waves as defined in claim 4, wherein said bonding means is connected at its opposite ends to said surface defining members, respectively, in electrically conductive relation.

12. Apparatus for suppressing noise radio waves as defined in claim 11, wherein said bonding means comprises an insulated electric wire having terminal strips at its opposite ends, and means for coupling and shorting said respective terminal strips to said surface defining members of said body in electrically conductive relation.

* * * * *